United States Patent [19]

Cragun

[11] Patent Number: 5,461,399
[45] Date of Patent: Oct. 24, 1995

[54] METHOD AND SYSTEM FOR ENABLING VISUALLY IMPAIRED COMPUTER USERS TO GRAPHICALLY SELECT DISPLAYED OBJECTS

[75] Inventor: Brian J. Cragun, Rochester, Minn.

[73] Assignee: International Business Machines, Armonk, N.Y.

[21] Appl. No.: 173,536

[22] Filed: Dec. 23, 1993

[51] Int. Cl.$^6$ ........................................................ G09G 3/02
[52] U.S. Cl. ...................... 345/145; 345/156; 340/825.19; 434/113
[58] Field of Search ....................................... 345/145, 156, 345/157; 341/21, 27; 340/384.1, 825.19; 434/112, 113, 114, 116

[56] References Cited

U.S. PATENT DOCUMENTS 5,223,828 6/1993 McKiel, Jr. ........................ 340/825.19
5,287,102 2/1994 McKiel, Jr. ........................ 340/825.19

OTHER PUBLICATIONS

Robert Cowart, "Mastering Windows 3.1", 1992. p. No. 128.

Primary Examiner—Richard Hjerpe
Assistant Examiner—Kent Chang
Attorney, Agent, or Firm—L. Bruce Terry; Andrew J. Dillon

[57] ABSTRACT

A method and system for enabling a visually impaired computer user to distinctly visualize individual objects classified among multiple classes of objects within a graphical user interface environment. Within the graphical user interface environment, graphical user interface objects are classified among multiple classes of objects. An audio signal, having at least two audible characteristics, is associated with each object within a class of objects. The first audible characteristic is common among all objects within a class of objects and unique among all objects in other classes of objects. The second audible characteristic is unique among all objects within a class of objects. Thereafter, a composite audible signal is generated for each displayed object which includes audio signals which each include these two audible characteristics. By listening to the first audible characteristic, which is associated with all objects within a particular class, a visually impaired user may be able to determine how many classes of objects are displayed, and distinguish those classes of objects from one another. By listening to the second audible characteristic, which is unique among all audible characteristics associated with objects in the same class, a visually impaired user may be able to determine how many objects are displayed within a particular class, and distinguish those objects from one another. By enabling a visually impaired user to distinguish classes of objects, and the distinguish objects in a particular class, such a user may perform computer operations and utilize a graphical user interface more efficiently.

14 Claims, 6 Drawing Sheets

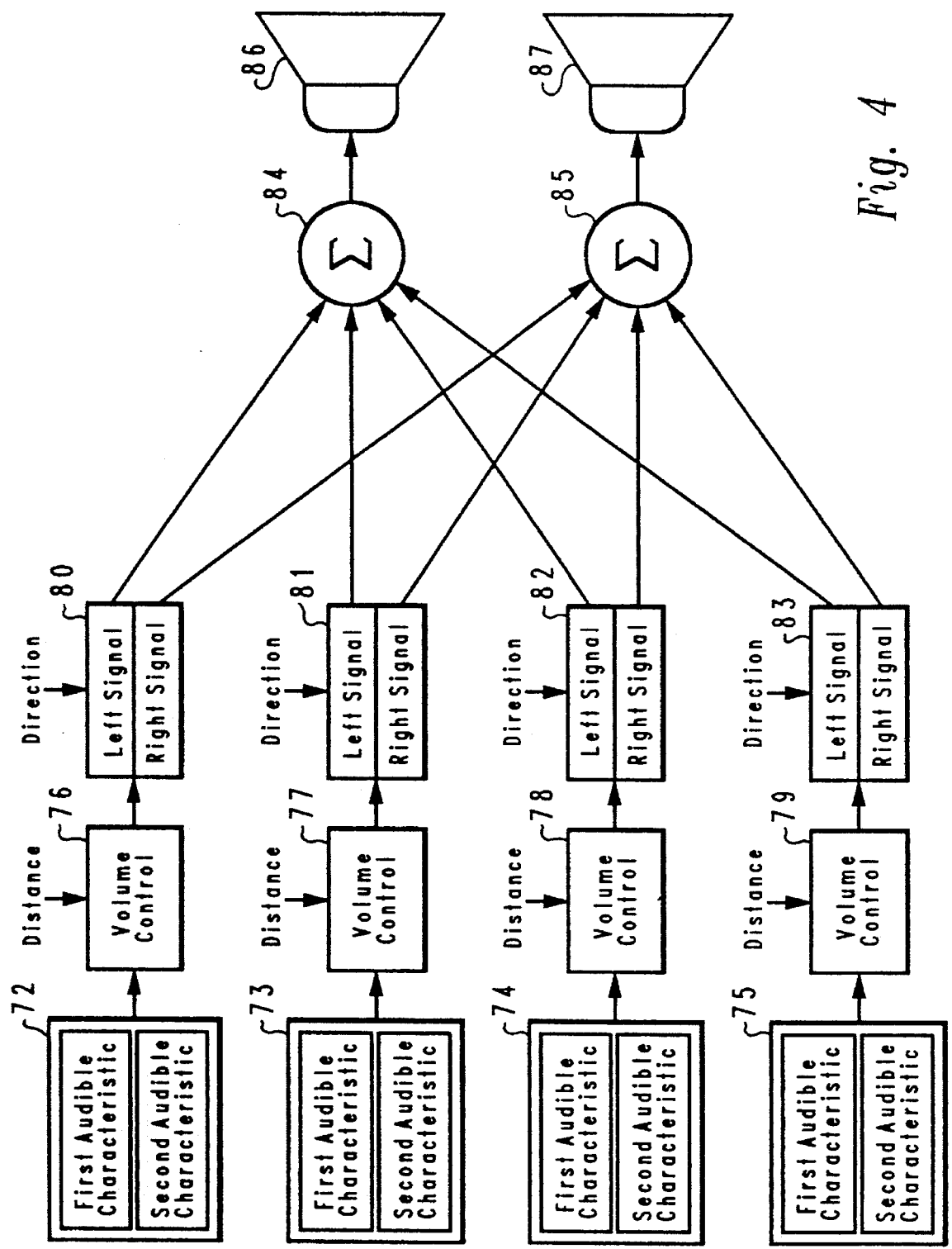

METHOD AND SYSTEM FOR ENABLING VISUALLY IMPAIRED COMPUTER USERS TO GRAPHICALLY SELECT DISPLAYED OBJECTS

BACKGROUND OF THE INVENTION

1. Technical Field

The present invention relates in general to a method and system for enhancing the usability of data processing systems by visually impaired users, and more particularly to a method and system for permitting visually impaired users to utilize a graphical user interface.

2. Description of the Related Art

In recent years, there has been a move among computer application software developers toward graphical user interfaces. In a graphical user interface, objects, such as file cabinets, folders, documents, and printers, are displayed on the computer screen as miniature graphic representations or icons. These objects are comprised of a group of pixels on the computer screen which may be selected to resemble physical object analogous to the displayed object's function in the computer environment. These objects should not be confused with "object code" or "objects" as utilized in "object-based" or "object-oriented" programming languages. In the graphic user interface, users may manipulate these objects in ways which are similar to the manner in which such analogous objects are manipulated in the work place. Users may manipulate these objects with a mouse or other graphical pointing device to perform desired computer operations.

For example, in the work place, in order to file a document in a folder which is located within a file cabinet, a user will open the file cabinet, locate and open the correct folder, and then place the document inside. Similarly, in the "electronic work place" of the graphical user interface, the user performs the process on a computer screen. Thus, a user will open the file cabinet icon, locate the correct folder icon, and then drop the document icon in the located folder. Users are thus able to transfer their knowledge of a real work place in order to perform similar operations in the computer.

Normally sighted individuals find graphical user interfaces intuitive and easy to work with. However, except for an occasional "beep" or similar tone, graphical user interfaces are virtually silent and the vast majority of the information which such interfaces provide to the user is visual. For example, the appearance of the object or icon may convey information to the user about the data the object represents or how the object interacts with other objects. An object representing an application may have an appearance related to the function of the application, such as, for example, a drawing application may be .represented by an object or icon that resembles a T square and a pencil. Similarly, documents created by an application will be represented by an object that resembles the object that represents the parent application, thereby conveying information about the format of the document.

Other objects may receive and contain objects, such as, for example, an object that resembles a file folder may be utilized to contain other objects representing applications, and documents created by such applications, as an aid to filing and organizing data within the disk drive. Still other objects may perform a function within the data processing system, such as, for example, an object that resembles a trash can may be utilized to perform the function of deleting selected files from a disk drive.

When operating a computer utilizing a graphical user interface, it may be helpful for the user to mentally classify objects into classes of objects, such as, for example, device, data, and container classes. By utilizing this classification, a user, who may be looking for a particular data file, is able to search each container object for the particular data file because the user is able to distinguish container objects, which contain other objects from data objects or device objects, which do not contain other objects. Thus, if a user is able to recognize and distinguish classes of objects, the user may be able to find a desired data file, or complete other similar computer operations, in a more efficient manner.

Since visually impaired users are not able to visually recognize and distinguish classes of objects displayed on the computer screen, graphical user interfaces are essentially not usable by severely visually impaired people. Moreover, even if a visually impaired person were able to locate objects within a graphical user interface, such a user may not be able to benefit from the large amount of information that would be communicated graphically if the user was sighted.

Although visually impaired computer users currently benefit from many forms of adaptive technology, including speech synthesis, large-print processing, braille desk top publishing, and voice recognition, almost none of the foregoing tools have been adapted for use with a graphical user interface. However, there have been a few suggestions of how to incorporate such adaptive technology for use with a graphical user interface. For example, an article published in *Byte Magazine* suggests that programmers could write software with built-in voice labels for icons. Lazzaro, Windows of Vulnerability, Byte Magazine, (June 1991), page 416. In another example, various synthetic or recorded speech solutions for making computer display contents available to visually impaired persons have been suggested in Golding et al., IBM Technical Disclosure Bulletin, Vol. 26, No. 10B, pages 5633–5636 (March 1984); and Barnett et al., IBM Technical Disclosure Bulletin, Vol. 26, No. 10A, pages 4950–4951 (March 1984). In each of these examples, a visually impaired user is not aided in locating objects on the computer display. Nor do these examples suggest how a user may determine what kind of objects are available on the computer display screen.

Additionally, systems have been suggested which include a mouse with a braille transducer so that a blind mouse user may read text and obtain certain tactile position feedback from such a mouse. Comerford, IBM Technical Disclosure Bulletin No. 3, Vol. 28, page 1343 (August 1985); and Affinito, et al., IBM Technical Disclosure Bulletin No. 12, Vol. 31, page 386 (May 1989). However, while such systems announce various text items, either audibly or by means of a braille transducer in the mouse, and may provide some information to a visually impaired user, such systems do not enable a user to navigate about, and locate objects on, the computer display screen. Nor do such systems enable a user to determine how many disk drives, for example, are connected to the computer system.

It has also been suggested that an audible cursor positioning and pixel (picture element) status identification mechanism may be utilized to help a user of an interactive computer graphics system locate data by utilizing aural feedback to enhance visual feedback. As the cursor in such a system is stepped across the screen, an audible click is generated which varies in tone, corresponding in tone to the current status of each pixel encountered. With this combination of audible and visual cursor feedback, it becomes a more simple task to identify a desired line by noting the change in tone as the cursor moves. For color display applications, each color is represented by a distinct tone so that any single pixel may be distinguished from surrounding pixels of a different color. It has been suggested that this system is especially helpful for visually impaired or learning disabled users. Drumm et al., IBM Technical Disclosure Bulletin No. 48, Vol. 27, page 25–28 (September 1984). However, the foregoing disclosure does not suggest a means of enabling a visually impaired user to navigate about, or locate objects within, a graphical user interface on a computer display screen, nor does it suggest a means of enabling such a user to distinguish objects among multiple classes of objects.

Recently, in a patent application entitled "Method and System for Enabling a Blind Computer User to Handle Message Boxes in a Graphical User Interface," U.S. patent application Ser. No. 07/746,838, filed Aug. 19, 1991, a system has been proposed which permits a visually impaired user to interact with a so-called "message box" within a graphical user interface. As those skilled in the art will appreciate, each message box consists of an icon, explanatory text, and one or more "push buttons." The icon allows the user to identify visually the type of message. The text typically explains the situation and may provide assistance. The textual content may be a question or a statement. Push buttons provided within a message box typically allow the user to interact with the message box.

This proposed system permits visually impaired users to accommodate a message box by announcing the textual contents of such a box when the message box first appears. Thereafter, the push buttons available to respond to the message box are also announced in order from left to right. A homing signal is then provided for finding the message box which increases in pitch as the mouse pointer approaches the message box. When the pointer enters the message box, the message box text and available push buttons are reannounced and the pointer is automatically moved to a default push button. By utilizing this system, a visually impaired user may locate a message box within a computer display system; however, this system fails to provide any suggestion of a manner in which a visually impaired user may selectively locate and distinguish graphical user interface objects that belong to one class from those objects belonging to another class within a graphical user interface.

Another method and system, which have also been recently proposed in a patent application entitled "Audio User Interface with Stereo and Filtered Sound Effects," U.S. patent application Ser. No. 07/746,840, filed Aug. 19, 1991, permits a visually impaired user to locate a mouse pointer or other graphical pointing device within the client area of a window within a graphical user interface by providing a stereo sound system and varying the intensity of the left and right audio channels to indicate a position of the mouse pointer. This system also proposes an increase in pitch of an associated sound to indicate the position of the pointer in the top or bottom of the client area of a window. While this system permits a visually impaired user to manipulate a mouse pointer within a graphical user interface, it fails to show or suggest any technique whereby a particular one of a group of displayed graphical objects may be selected by such a user, or whereby a user may distinguish objects of one class form those of another.

Yet another method and system have been recently proposed in a patent application entitled "Method and System for Enabling Blind or Visually Impaired Computer Users to Graphically Select Displayed Elements," U.S. patent application Ser. No. 07/802,956, filed Dec. 5, 1991, wherein graphic elements within a computer display may be located by a visually impaired user by associating a selected radius defining an area of interest surrounding the vertex of a pointer, controlled by a mouse or other graphical pointing device, and thereafter generating composite audible signals which include identifiable audible signals associated with each graphic element within the computer display. By generating a composite signal, or by cyclicly generating a composite signal, having elements of each identifiable audible signal associated with a graphic object having picture elements within a rotatable sector of the area of interest, a visually impaired user may rapidly and efficiently locate selected objects within the computer display. While this method and system permits a visually impaired user to locate graphical user interface objects within a computer display, it fails to show or suggest any technique whereby a user may distinguish objects of one class from those of another.

SUMMARY OF THE INVENTION

It is therefore one object of the present invention to provide a method and system for enhancing the usability of data processing systems by visually impaired users.

It is another object of the present invention to provide an improved method and system for permitting visually impaired users to utilize a graphical user interface within a computer system.

It is yet another object of the present invention to provide an improved method and system for enabling a visually impaired user to visualize, distinguish, and select displayed objects, belonging to one of multiple classes of objects, in a graphical user interface.

The foregoing objects are achieved as is now described. The method and system of the present invention may be utilized to enable a visually impaired computer user to distinctly visualize individual objects classified among multiple classes of objects within a graphical user interface environment. Within the graphical user interface environment, graphical user interface objects are classified among multiple classes of objects. An audio signal, having at least two audible characteristics, is associated with each object within a class of objects. The first audible characteristic is common among all objects within a class of objects and unique among all objects in other classes of objects. The second audible characteristic is unique among all objects within a class of objects. Thereafter, a composite audible signal is generated for each displayed object which includes audio signals which each include these two audible characteristics. By listening to the first audible characteristic, which is associated with all objects within a particular class, a visually impaired user may be able to determine how many classes of objects are displayed, and distinguish those classes of objects from one another. By listening to the second audible characteristic, which is unique among all audible characteristics associated with objects in the same class, a visually impaired user may be able to determine how many objects are displayed within a particular class, and distinguish those objects from one another. By enabling a visually impaired user to distinguish classes of objects, and the distinguish objects in a particular class, such a user may perform computer operations and utilize a graphical user interface more efficiently.

BRIEF DESCRIPTION OF THE DRAWINGS

The novel features believed characteristic of the invention are set forth in the appended claims. Other objects and advantages of the invention will be apparent upon reading the following description in conjunction with the drawings in which:

FIG. 4 is a high level block diagram of a sound generation system which may be utilized to implement the method and system of the present invention.

DETAILED DESCRIPTION OF PREFERRED EMBODIMENT

Figure 1:
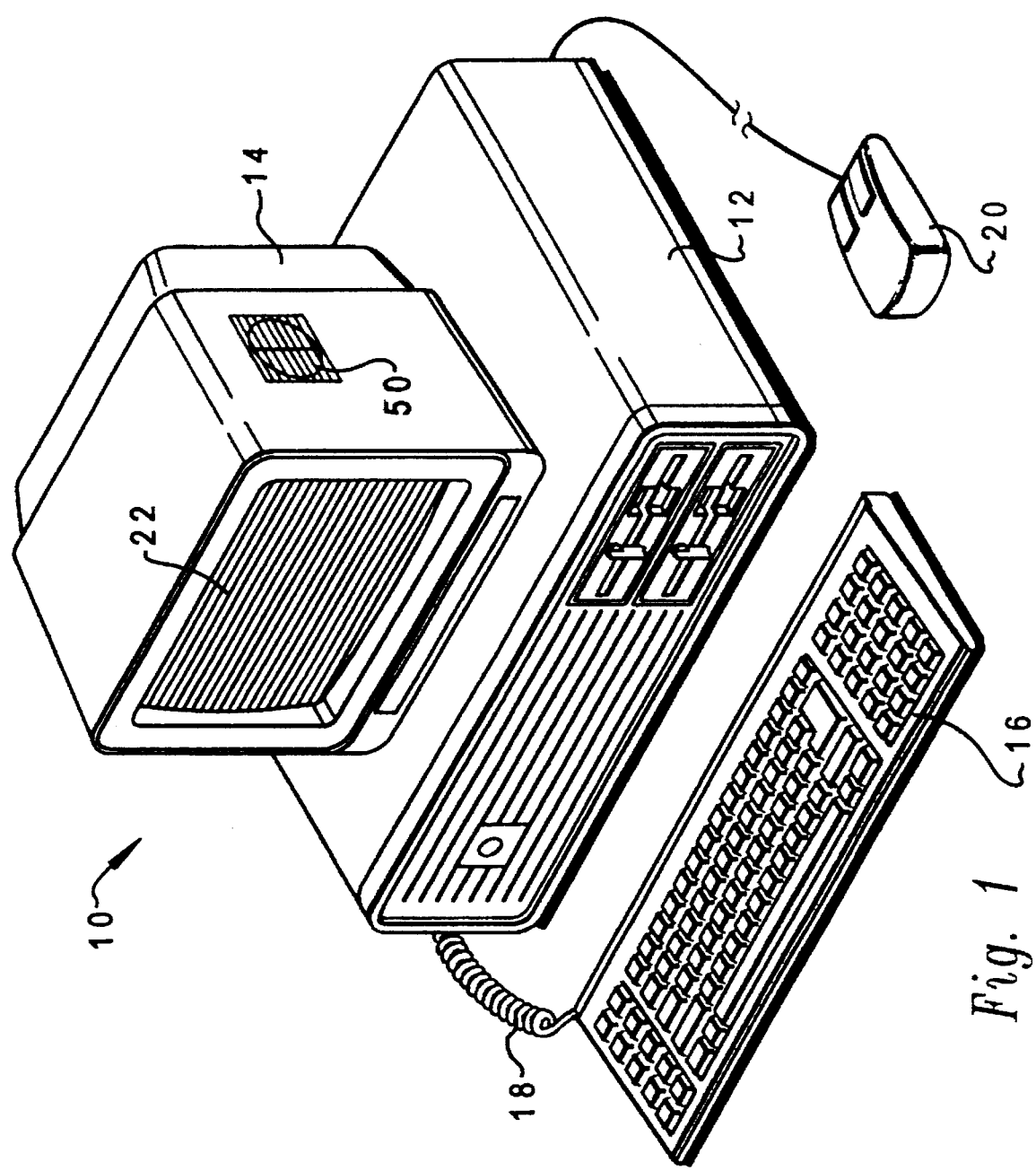
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As is illustrated, data processing system 10 preferably includes a processor module 12 and a display 14. Keyboard 16 is coupled to processor module 12 by means of cable 18 in a manner well known in the art. Also coupled to processor module 12 is mouse 20.

As depicted, display 14 includes a display screen 22 and at least one speaker 50. Those skilled in the art will appreciate that data processing system 10 may be implemented utilizing any one of several known personal computer systems. However, the preferred embodiment utilizes a personal computer sold under the trademark "ValuePoint" by International Business Machines Corporation.

Figure 2:
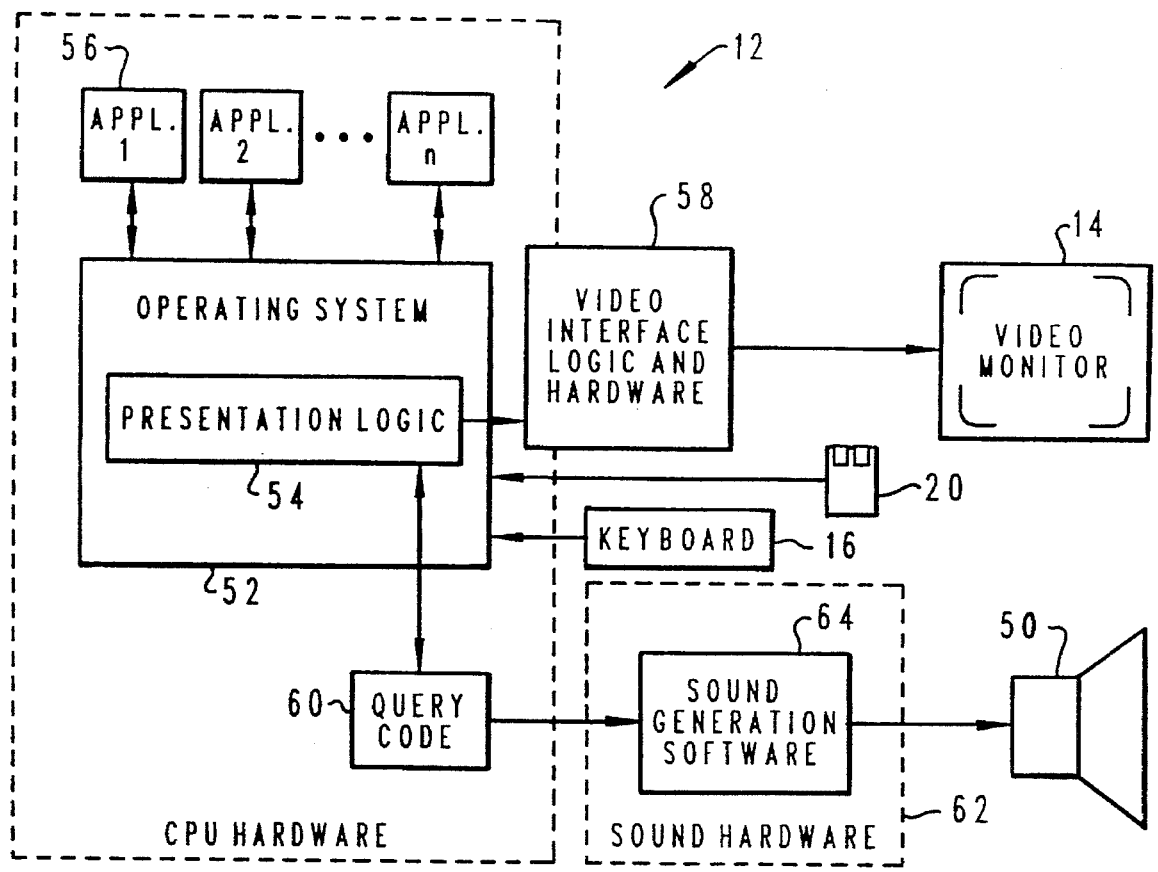
FIG. 2 is a high level block diagram of the data processing system of FIG. 1.

Referring now to FIG. 2, there is depicted a high level block diagram of data processing system 10 of FIG. 1. As is illustrated, the central processing unit hardware within processor module 12 is depicted within the dashed rectangle, which is also numbered 12. Operating within the central processing unit hardware is an operating system 52 which preferably includes presentation logic 54. A plurality of applications 56 are depicted running on operating system 52. Video interface logic and hardware 58 receives information from presentation logic 54, which is, in a manner well known to those skilled in the art, displayed within video display 14. Mouse 20 and keyboard 16 are also depicted within FIG. 2, coupled to operating system 52 in a manner well known in the art of personal computer design.

Data processing system 10 preferably includes query code 60 which receives information from presentation logic 54 which includes the type of window displayed within video display 14, including the position and size of the window, and the current pointer position associated with mouse 20. Query code 60 preferably provides information to sound generation software 64 within sound hardware 62 in order to provide composite audible signals, which include elements which may be utilized by a visually impaired user to locate and identify the class of selected graphic objects within video display 14. The composite audio signals thus generated are coupled to audio output devices, such as speaker 50, and utilized in the manner which will be explained in greater detail herein.

Figure 3:
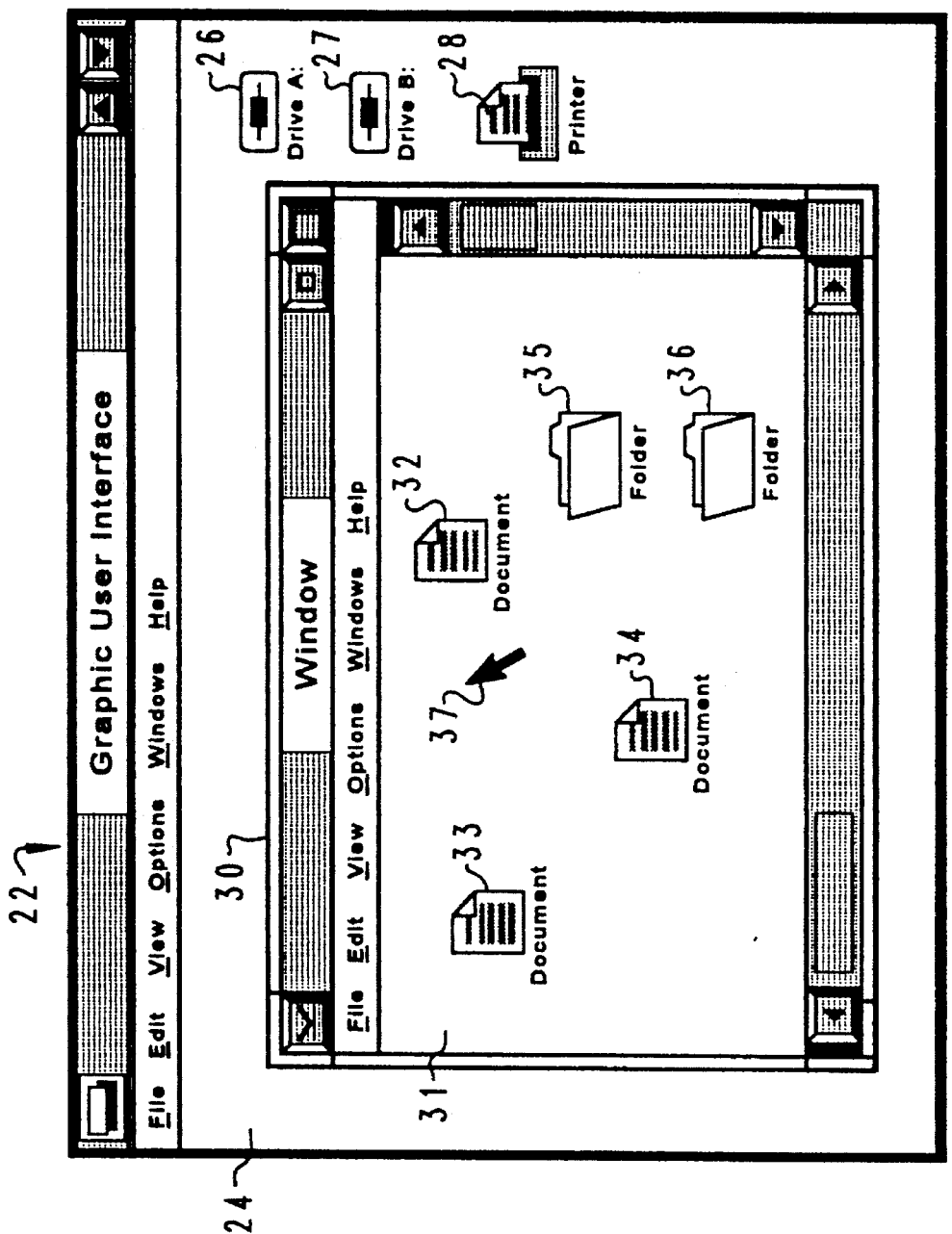
FIG. 3 is a pictorial representation of a display presentation which may be utilized to illustrate the method and system of the present invention.

With reference now to FIG. 3, there is depicted a pictorial representation of a display presentation which may be utilized to illustrate the method and system of the present invention. As illustrated, a graphical user interface is presented within display screen 22. Those persons skilled in the art should recognize that objects displayed within a graphical user interface environment may be classified into multiple classes of objects including: device, data, and container classes. Of course, other object classification schemes may be formulated and may be more useful for performing various tasks. Workplace 24, which is classified as a container, is a space provided by the graphical user interface wherein a user may perform all tasks and wherein all user objects reside. In this example, the area of display screen 22 is substantially equivalent to workplace 24.

Within workplace 24, drive A 26, drive B 27, printer 28, and window 30 are displayed. Printer 28 is one example of a device object. A device object is an object that represents a physical or logical device, such as a printer, mouse, or scanner, that is associated with a user's system. Users may typically access or transfer data to such a device by "dragging" and "dropping" objects onto device object icons.

Drive A 26, drive B 27, and window 30 are examples of container objects whose purpose is to hold other objects. Window 30 may include numerous features and/or indicators which include: a window title, a system menu symbol, and window sizing buttons located in a title bar; a menu bar, located below the title bar, that contains choices that display pull-down menus; a status area for displaying information that indicates the state of an object or the state of a particular view of an object; vertical and horizontal scroll bars, scroll boxes, scroll buttons, and split box indicators; and an information area which displays information about the object or choice that the pointer is on.

Window 30 defines work area 31, which is a container utilized to group windows and objects to perform a task. As depicted, work area 31 contains document 32, document 33, document 34, folder 35, and folder 36. Documents 32-34 are typical examples of data objects. Documents 34 represent data files which may have been created by an application program, such as, for example, a word processing application, a data base application, a spread sheet application, or the like. Folder 35 and folder 36 are container objects for containing and facilitating the organization of other objects within data processing system 10.

Also displayed within work area 31 is pointer 37. Pointer 37 is a moveable, visible mark utilized to indicate the position at which an operation may occur within workplace 24. A pointing device, such as mouse 20, is utilized to move pointer 37 within workplace 24.

In accordance with a preferred embodiment of the present invention, an audio signal is associated with each object displayed within workplace 24. Thereafter, a composite audible signal is generated which includes elements of each audio signal associated with each of the displayed objects. The generation of such a composite audible signal is described below in greater detail.

Referring now to FIG. 4, there is depicted a high level block diagram of a sound generation system which may be utilized to implement the method and system of the present invention. Such a sound generation system is commercially available as a plug-in sound board for a personal computer. An example of such a plug-in sound board is the "M-Audio Capture & Playback Adapter," which is manufactured for sale by International Business Machines Corporation for the line of personal computers sold under the trademark "ValuePoint." As illustrated, the depicted system includes four signal sources 72–75. Signal sources 72–75 each generate an audio signal which is comprised of at least two audible characteristics. Such audible characteristics will be described in greater detail below. Signal sources 72–75 may generate the audio signals by utilizing an oscillator, for example, or may generate the audio signals by converting digitized audio data recalled from memory. In accordance with the method and system of the present invention, each audio signal generated by signal sources 72–75 is associated with an object displayed in workplace 24. Those persons skilled in the art should recognize that additional signal sources, such as signal sources 72–75, may be required in order to associate an audio signal with each object displayed within workplace 24.

As illustrated in FIG. 4, the output of each signal source 72–75 is coupled to a volume control 76–79 respectively. Volume controls 76–79 are preferably utilized to vary the volume of an audio signal generated by an associated signal source, in response to a distance between pointer 37 and an object associated with that audible signal. Distance information is provided to distance modifier 76 by query code 60. Query code 60 receives information from presentation logic 54, which includes the current pointer position associated with mouse 20. For example, as illustrated in FIG. 3, if pointer 37 is located closer to document 32 than to document 33, the audio signal associated with document 32 would sound louder than the audio signal associated with document 33 because pointer 37 is located closer to document 32 than to document 33.

After the volume of the audio signal associated with each displayed object has been modified, the outputs of each volume control 76–79 are coupled to direction modifiers 80–83. Direction modifiers 80–83 are utilized to create a left audio signal and a right audio signal associated with each displayed object. By appropriately creating and modifying left and right audio signals, a user listening to such signals may be able to perceive a direction of such an audio signal, in either two or three dimensions. For example, if an audio signal is heard in the user's left ear slightly before the audio signal is heard in the user's right ear, the user may perceive the audio signal as coming from the user's left side. By varying such characteristics as audio signal intensity, audio signal delay, audio signal phase, audio signal spectral content, and audio signal reverberation, a combination of left and right channel audio signals may be produced which may enable a listener to perceive a sound as emanating from a particular direction relative to the user, including up or down directions.

Finally, the outputs of each direction modifier 80–83 are coupled to summation circuits 84 and 85. Each left audio signal is coupled to summer 84 and each right audio signal is coupled to summer 85. Summers 84 and 85 are utilized to generate left and right composite audible signals which include elements of each audio signal associated with each object displayed within workplace 24. These left and right composite audible signals are then coupled to audio output devices 86 and 87. Audio output devices 86 and 87 may be implemented utilizing a pair of speakers, such as speaker 50 of FIG. 1.

Those persons skilled in the art should recognize that summers 84 and 85, which are utilized to generate left and right composite audible signals, may generate such composite audible signals simultaneously or serially. A simultaneous composite audible signal may be comprised of all audio signals associated with a displayed object, as processed by an associated volume control and direction modifier, simultaneously summed, wherein a user may hear all such modified audio signals simultaneously. Alternatively, summers 84 and 85 may sum the coupled and appropriately modified audio signals in a sequential or serial manner. That is, appropriately modified audio signals associated with displayed objects may be individually heard by a user for a short period of time during a cycle. Such a cycle may then be repeated indefinitely, with appropriate modifications being made to the audio signals as the pointer moves about workplace 24.

Those persons skilled in the art should also recognize that summers 84 and 85 may selectively eliminate or filter out audio signals associated with selected displayed objects, in response to a user input described below in more detail.

Figure 5A:
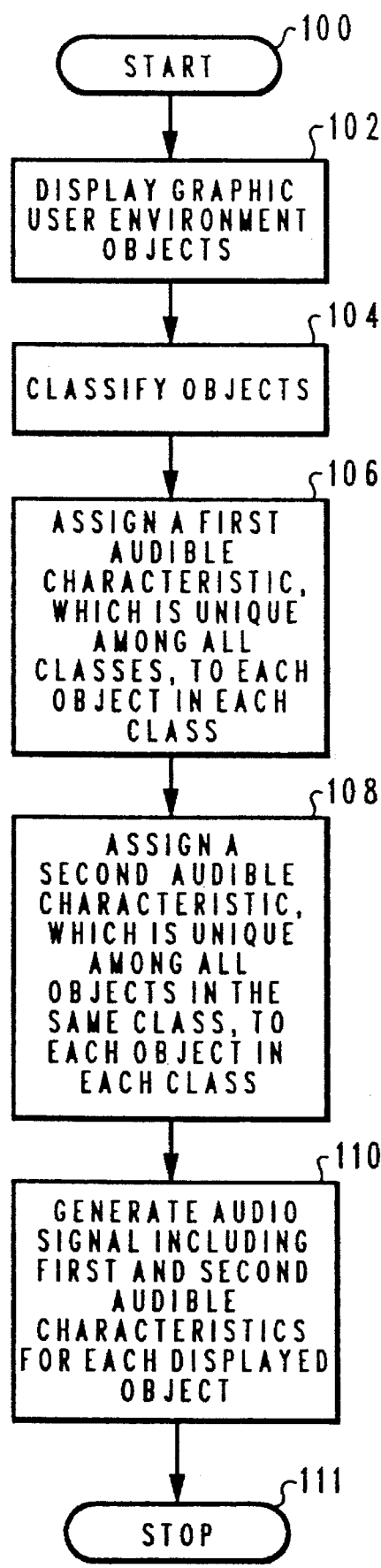
FIGS. 5a and 5b depict a high level logic flowchart which illustrates a preferred software implementation of the method and system of the present invention.
Figure 5B:
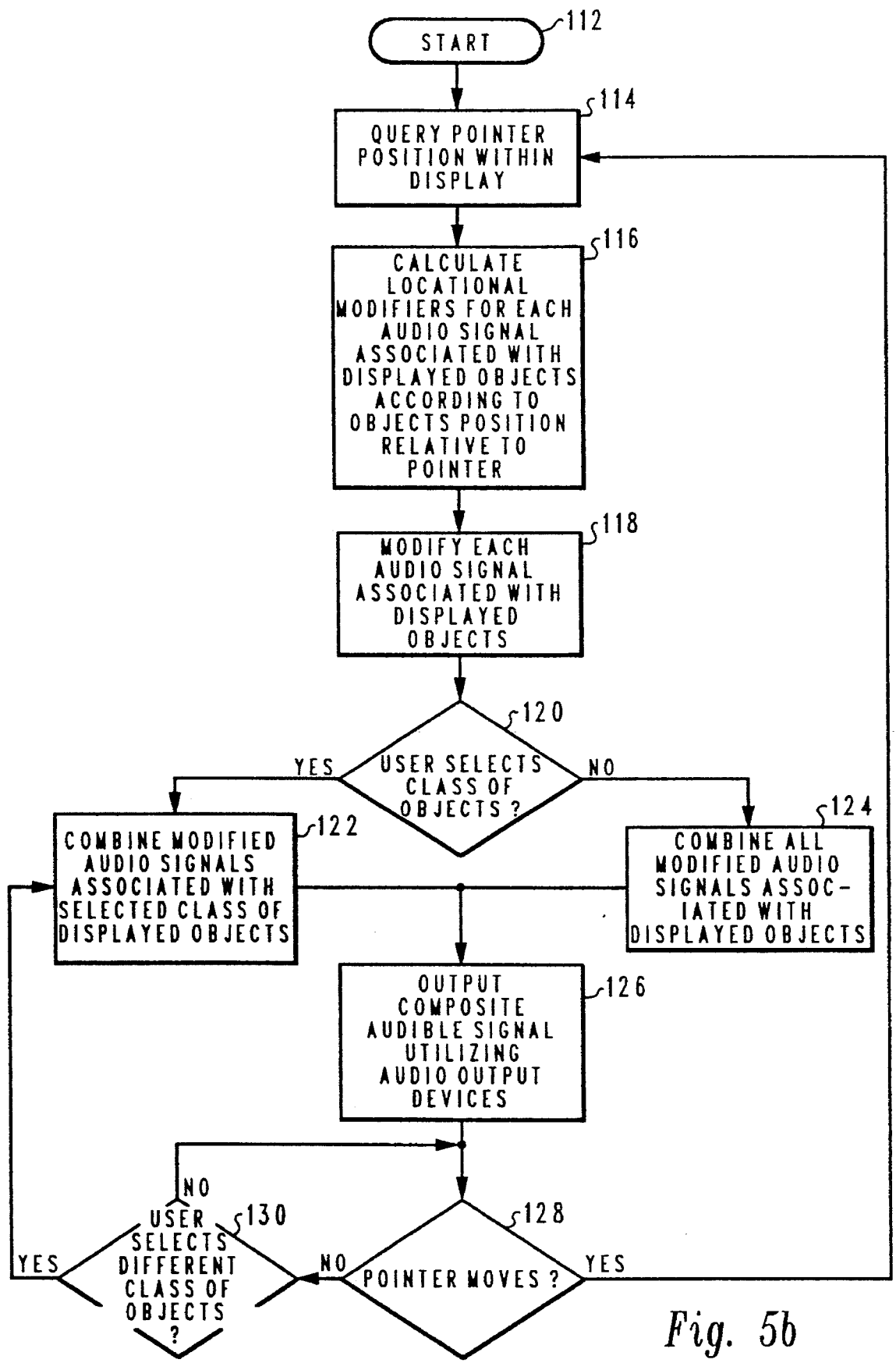

Finally, with reference to FIGS. 5a and 5b, there is depicted a high level logic flowchart which illustrates a preferred software embodiment of the present invention. FIG. 5a depicts an initialization process, which begins at block 100 and thereafter passes to block 102. Block 102 depicts the display of graphical user interface environment objects. Such objects may include disk drives, folders, applications, documents and data files, printers and other peripheral equipment, and similar objects typically utilized in a graphical user interface environment.

Next, the process passes to block 104, which illustrates the classification of such graphical user interface environment objects. One classification system discussed previously classifies objects into three classes: device, data, and container. The following list of object classes is another example of a classification system that may enable a visually impaired user to visualize, or create a mental image of, a graphical user interface environment. For example, object classes may include: applications, documents or data files, disk drives, folders, network connections, printers or peripheral devices, and a trash can (or other such object for deleting files).

Those persons skilled in the art will recognize that objects within such classes may be further subclassified. For example, the class of documents or data files may be subclassified according to the application program that created such files. Thus, documents or data files may be further subclassified into a class of documents created by a word processor sold under the trademark "MICROSOFT WORD," or a word processor sold under the trademark "WORDPERFECT," or other like classes of objects associated with other word processing programs. Or similarly, documents in a class defined by the contents of a selected folder may be subclassified by size, date of creation, or date of last modification.

Next, as depicted at block 106, the process assigns a first audible characteristic, which is unique among all classes of objects, to all objects in each class. Thereafter, as illustrated at block 108, the process assigns a second audible characteristic, which is unique among all objects in the same class, to all objects in each class. Such first and second audible characteristics may include pitch, timber (i.e., the quality of a tone distinctive of a particular singing voice or musical instrument due to a combination of selected overtones), meter (i.e., the basic recurrent rhythmical pattern of note durations, accents, and beats per cycle), volume, and sound direction relative to the user's location. The first audible characteristic distinguishes all objects in a class from objects belonging to other classes. The second audible characteristic distinguishes one object in a class from other objects in the same class.

For example, a first audible characteristic assigned to each object in a class of objects representing disk drives may be a "drum" sound. Such a drum sound may distinguish all objects in the "disk drive" class from, for example, objects which are members of a "folder" class and which may be assigned "animal" sounds. A second audible characteristic assigned to each object in the disk drive class may be the sound of a particular drum, such as a snare drum, or a tympani, or a base drum. Thus, a second audible characteristic may be utilized to distinguish individual objects in a class from all other objects in the same class.

Those persons skilled in the art should recognize that a first audible characteristic may also be comprised of any one of many combinations of pitch, timber, meter, volume, and sound direction, as long as such a first audible characteristic serves to identify an object as a member of a class, and to distinguish that object's class from all other classes within the graphical user interface environment. Therefore, a first audible characteristic may be a simple tone having a particular pitch and duration (meter), or a first audible characteristic may be a complex sound, such as a generic drum sound, which may identify a class of objects that a user may be tangibly familiar with, such as a class of musical instruments known as drums.

Similarly, a second audible characteristic may be comprised of one of several combinations of pitch, timber, meter, volume, and sound direction, as long as such a second audible characteristic distinguishes an assigned object within a particular class from all other objects in that particular class. Therefore, a second audible characteristic may be a simple tone that is distinguishable from the associated first audible characteristic, or the second audible characteristic may be a complex sound, such as the sound of a snare drum, which serves to distinguish an object within a particular class of objects that sound like other types of drums.

Next, as depicted at block 110, the process generates an audio signal, which includes first and second audible characteristics, for each displayed object. Thereafter, the initialization process stops, as illustrated at block 111.

Referring now to FIG. 5b, the process of locating graphical user interface objects begins at block 112, and thereafter continues to block 114. Block 114 illustrates the querying of a pointer position within the display. Such a query of the pointer position may produce a pixel-row/pixel-column address which describes the position of the pointer within the display. As discussed previously, query code 60 may obtain the current pointer position associated with mouse 20 from presentation logic 54.

Thereafter, as depicted at block 116, the process calculates locational modifiers for each audio signal associated with displayed objects, according to the object's position relative to the pointer position within workplace 24. As discussed previously, if signal volume and signal direction are the selected design parameters utilized to convey to a user the location, relative to the pointer position, of other objects displayed, the process calculates such locational modifiers which may thereafter be utilized to modify the volume and the directional characteristics of the audio signal associated with each displayed object.

Next, as illustrated at block 118, such locational modifiers are utilized to modify each audio signal associated with each displayed object. As an example, consider the situation wherein an object is on the far left side of the display and the pointer is on the far right side of the display. In this situation, the user may hear the audio signal associated with the object on the left side of the screen as a faint sound coming from the left direction. If the user then moves the cursor to the left, toward the object on the left side of the screen, the volume of the audio signal associated with the object on the left of the screen would increase as the cursor moved closer to the object.

Should the user thereafter move the pointer to a position on the screen to the left of the object, the audio signal associated with that object, which initially sounded as if it were coming from the left, would be modified as the user moves the pointer around the object such that the sound apparently moves from a leftward direction to a rightward direction.

Next, as depicted at block 120, the process determines whether or not a user has selected a class of objects the user desires to hear. By selecting a class of objects, the user may eliminate the audio signals associated with displayed objects belonging to other classes, thereby enabling the user to concentrate on the audio signals belonging to members of a selected class. Therefore, if many objects are displayed within workplace 24, a user may eliminate or filter out audio signals associated with displayed objects that the user does not wish to interact with at the moment. A user may select a class of objects to listen for by entering a designated key sequence utilizing keyboard 16, or pressing a designated sequence of buttons on mouse 20.

If a user has selected a class of objects to listen for, the process then combines or sums the modified audio signals associated with the selected class of displayed objects, as illustrated at block 122. If the user has not selected a class of objects to listen for, the process combines or sums all modified audio signals associated with each displayed object. Thus, depending upon whether or not the user has selected a class of objects to listen for, the user may be able to hear a summation, or composite audible signal, which includes audio signals associated with a particular class of displayed objects or all displayed objects, at a volume, and from a perceived direction, relative to each object's distance and direction from the pointer position within the display. As discussed previously, the summation operation which produces the composite audible signal may be implemented serially or sequentially.

Thereafter, as illustrated at block 126, the process outputs such a composite audible signal, which may include left and right composite audible signals, utilizing audio output devices, such as, for example, audio headphones or speakers.

As depicted at block 128, the process then determines whether or not the pointer has moved within the display. If the pointer has moved, the process passes to block 114, wherein the process determines the new pointer position within the display and generates a new combined audible signal, as described above, in response to the new pointer position within the display.

If the pointer has not moved, the process passes to block 130. Block 130 illustrates the determination of whether or not the user has selected a different class of objects to listen for. If the user has not selected a different class of objects to listen for, the process returns to block 128 via the "no" branch from block 130. If the user has selected a different class of objects to listen for, the process passes to block 122, and a new composite audible signal is generated as described above.

Upon reference to the foregoing, those skilled in the art will appreciate that the Applicant herein has provided a technique whereby graphical user interface objects within a computer display may be located by a visually impaired user by associating an appropriately modified audio signal having multiple audible characteristics capable of distinguishing displayed objects within a class and classifying objects as members of a distinguishable class of objects.

While the invention has been particularly shown and described with reference to a preferred embodiment, it will be understood by those skilled in the art that various changes in form and detail may be made therein without departing from the spirit and scope of the invention.

I claim:

1. A method in a data processing system for enabling a visually impaired user to distinctly visualize individual displayed objects within multiple classes of objects displayed within a graphical user interface environment, said data processing system having a display pointing device associated with a moveable cursor element, a user input device, and an audio output device, said method comprising the steps of:

associating an audio signal having at least two audible characteristics with each object within a class of objects displayed within said graphical user interface environment, wherein a first of said at least two audible characteristics is common among all objects within a class of objects and unique among all of said multiple classes of objects within said graphical user interface environment, and a second of said at least two audible characteristics is unique among all objects within a class of objects; and generating a composite audible signal which includes elements of each audio signal associated with each of said objects displayed within said graphical user interface environment, wherein a user may determine how many classes of objects are displayed, and how many objects are displayed within each of said multiple classes of objects within said graphical user interface environment.

2. A method according to claim 1 wherein said first of said at least two audible characteristics comprises a timbre, and said second of said at least two audible characteristics comprises a pitch.

3. A method according to claim 1 wherein said first of said at least two audible characteristics comprises a generic drum audible characteristic, and said second of said at least two audible characteristics comprises a particular drum audible characteristic.

4. A method according to claim 1 wherein said first of said at least two audible characteristics comprises a tone, and said second of said at least two audible characteristics comprises a periodicity.

5. A method according to claim 1 further including the step of determining a direction from said moveable cursor element to each of said displayed objects, and wherein said step of generating a composite audible signal which includes elements of each audio signal associated with each of said objects displayed within said graphical user interface environment further includes the step of generating a left composite audible signal and a right composite audible signal.

6. A method according to claim 5 further including the step of determining a distance from said moveable cursor element to each of said displayed objects, and wherein said step of generating a left composite audible signal and a right composite audible signal further comprising the step of varying an intensity of each associated audio signal in proportion to said determined distance from said moveable cursor element to each of said displayed objects.

7. A method according to claim 1 wherein said step of generating a composite audible signal which includes elements of each audio signal associated with each of said objects displayed within said graphical user interface environment further comprises the step of generating a composite audible signal which includes elements of each audio signal associated with a selected class of said objects displayed within said graphical user interface environment, in response to a user input utilizing said user input device.

8. A data processing system for enabling a visually impaired user to distinctly visualize individual displayed objects within multiple classes of objects displayed within a graphical user interface environment, said data processing system having a display pointing device associated with a moveable cursor element, a user input device, and an audio output device, said data processing system comprising:

means for associating an audio signal having at least two audible characteristics with each object within a class of objects displayed within said graphical user interface environment, wherein a first of said at least two audible characteristics is common among all objects within a class of objects and unique among all of said multiple classes of objects within said graphical user interface environment, and a second of said at least two audible characteristics is unique among all objects within a class of objects; and means for generating a composite audible signal which includes elements of each audio signal associated with each of said objects displayed within said graphical user interface environment, wherein a user may determine how many classes of objects are displayed, and how many objects are displayed within each of said multiple classes of objects within said graphical user interface environment.

9. A data processing system according to claim 8 wherein said first of said at least two audible characteristics comprises a timbre, and said second of said at least two audible characteristics comprises a pitch.

10. A data processing system according to claim 8 wherein said first of said at least two audible characteristics comprises a generic drum audible characteristic, and said second of said at least two audible characteristics comprises a particular drum audible characteristic.

11. A data processing system according to claim 8 wherein said first of said at least two audible characteristics comprises a tone, and said second of said at least two audible characteristics comprises a periodicity.

12. A data processing system according to claim 8 further including means for determining a direction from said moveable cursor element to each of said displayed objects, and wherein said means for generating a composite audible signal which includes elements of each audio signal associated with each of said objects displayed within said graphical user interface environment further includes means for generating a left composite audible signal and a right composite audible signal.

13. A data processing system according to claim 12 further including means for determining a distance from said moveable cursor element to each of said displayed objects, and wherein said means for generating a left composite audible signal and a right composite audible signal further comprising means for varying an intensity of each associated audio signal in proportion to said determined distance from said moveable cursor element to each of said displayed objects.

14. A data processing system according to claim 8 wherein said means for generating a composite audible signal which includes elements of each audio signal associated with each of said objects displayed within said graphical user interface environment further comprises means for generating a composite audible signal which includes elements of each audio signal associated with a selected class of said objects displayed within said graphical user interface environment, in response to a user input utilizing said user input device.

* * * * *